Figure 1:
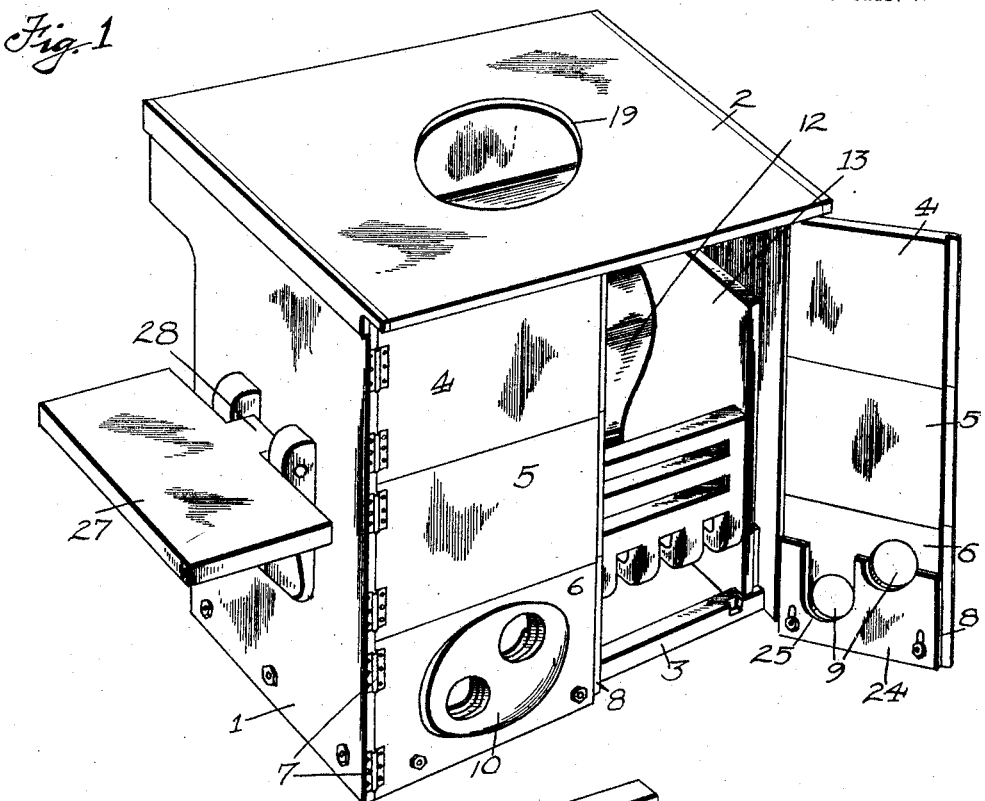

S. A. JONES.
STOVE.
APPLICATION FILED MAR. 31, 1919.

1,326,740.

Patented Dec. 30, 1919.
2 SHEETS—SHEET 1.

Inventor
S. A. Jones.

Attorney

S. A. JONES.
STOVE.
APPLICATION FILED MAR. 31, 1919.

1,326,740.

Patented Dec. 30, 1919.
2 SHEETS—SHEET 2.

Inventor
S. A. Jones.
By
Attorney

UNITED STATES PATENT OFFICE.

STUART ALEXANDER JONES, OF BESSEMER, ALABAMA.

STOVE.

1,326,740.   Specification of Letters Patent.   Patented Dec. 30, 1919.

Application filed March 31, 1919. Serial No. 286,333.

*To all whom it may concern:*

Be it known that I, STUART ALEXANDER JONES, a citizen of the United States, and a resident of Bessemer, in the county of Jefferson and State of Alabama, have invented certain new and useful Improvements in Stoves, of which the following is a specification.

My invention is an improvement in stoves, and has for its object to provide a stove capable of being arranged within a grate or fireplace, being seated upon the hearth in the opening of the grate or fireplace, and arranged to provide an open or a closed fire.

In the drawings:—

Figure 2:
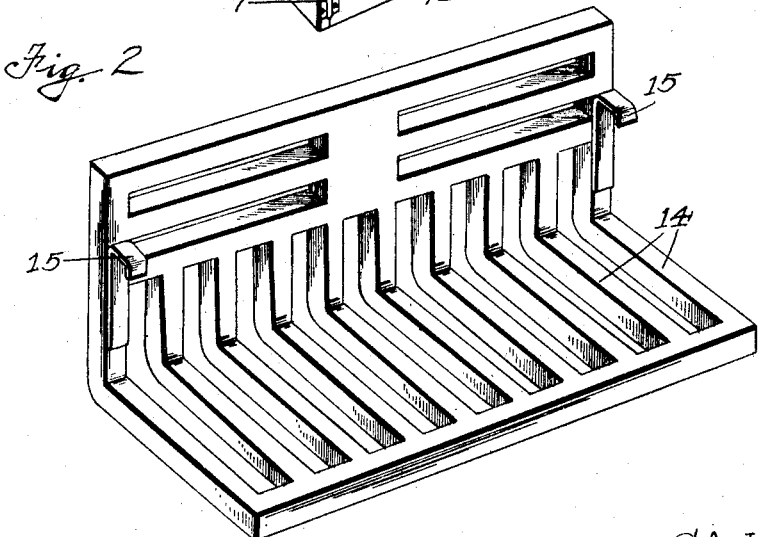
Figure 3:
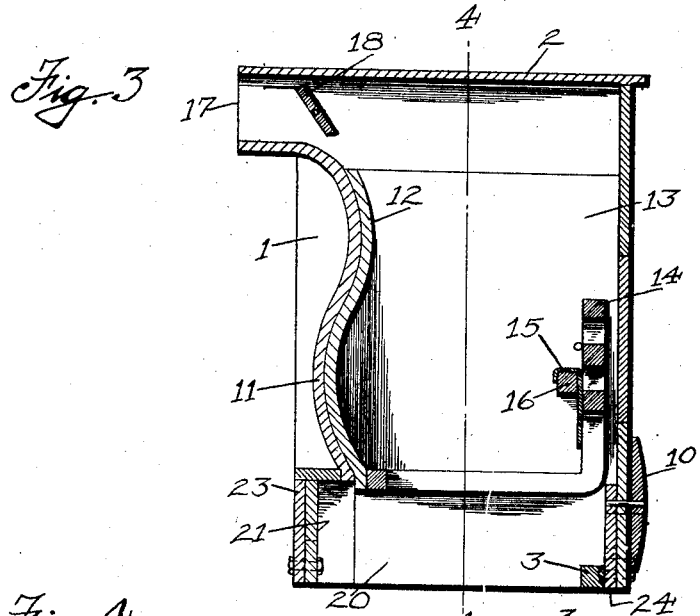
Figure 4:
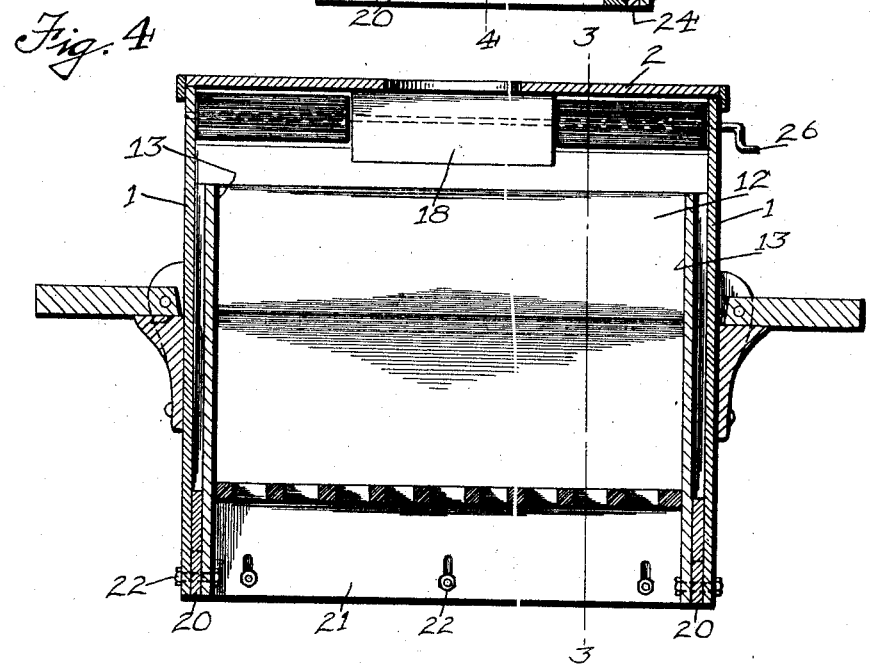

Figure 1 is a perspective view of the improved stove with one of the doors open, Fig. 2 is a perspective view of the grate from the rear, Fig. 3 is a section on the line 3—3 of Fig. 4, Fig. 4 is a section on the line 4—4 of Fig. 3.

In the present embodiment of the invention, a casing is provided consisting of ends 1 and a top 2, the top having a depending flange engaging the ends and resting upon the ends, and the ends are connected at the front of their bottom by a cross bar 3. A series of doors 4, 5, and 6 is hinged to the front edge of each end, the said doors of each series being capable of being opened and closed independently of each other, and these doors are hinged to the sides as indicated at 7.

The doors close against the cross bar 3 and their abutting edges are rabbeted as indicated at 8 to provide a close fit. The lowermost doors 6 have draft openings 9 which may be closed by a damper plate 10 arranged to rotate on the outer face of the door, and having openings adapted to register therewith.

The rear wall 11 of the stove has a contour of a double curve from above downward, and a fireback 12 rests against this wall. Firewalls 13 are arranged at the ends of the casing, the said fire walls forming with the fireback and the grate to be described, a receptacle for fuel, and it will be noted that the fire walls 13 are spaced apart from the end walls 1 of the casing.

The grate 14 is preferably a structure consisting of a vertical and a horizontal portion, and the vertical portion has hooks 15 which are adapted to engage over lugs 16 held on the fire walls 13. The rear bar of the grate as shown rests against the lower end of the fire back, and forms with the fireback and the fire walls a basket for the burning fuel.

The grate is spaced above the open body of the casing, to provide ample space for an ashpit, and an ash pan may be arranged within the pit if desired. Referring to Fig. 3, it will be noticed that an outlet 17 is provided for the smoke, the said outlet being at the top and center of the casing, and a damper 18 is arranged at the said outlet for controlling the fire. The top 2 has a central opening 19 which may be covered by a stove-lid if desired.

Means is also provided for permitting the casing and the grate to be raised above the hearth, *i. e.*, to be adjusted with respect to the hearth. The said means comprises plates 20 arranged on the inner faces of the ends at the bottom thereof, and adjustably connected to the ends by means of bolts and nuts 22, the said bolts passing through slots in the plates 21 and through openings in the end, the slots permitting vertical adjustment of the plates 20.

A plate 23 is arranged transversely of the back of the casing at the back thereof, a third plate 21 being adjustably mounted on this plate 23, in the same manner as the plates 20 are mounted on the ends, the plate 21 being held in adjusted position by bolts and nuts 22. Other plates 24 are connected with the doors 6, by means of bolts and nuts 22, the plates 24 being slotted in the same manner as the plates 20 and 21.

These plates 24 are notched or recessed at their tops as shown at 25, so that they will not interfere with the draft openings 9. In use, in order to adjust the grate to the proper height above the hearth, the nuts of the bolts 22 are loosened, and the plates 20 and 21 and 24 are lowered the proper distance to elevate the grate to the point desired. The nuts of the bolts are then tightened, and the casing will be held in such position. It will be understood that the grate is adjusted but once, namely, when the stove is set up.

A handle 26 is provided for manipulating the damper 18, and shelves 27 may be hinged to the ends of the casing, the hinged connection being indicated at 28, to swing into horizontal position or up against the casing. In use, the fuel is placed in the basket of the grate, and it will be evident that one or more of the doors 4, 5, and 6 may be opened to provide draft, or to provide an open fire. In starting the doors 4—5 will be closed, thus providing heavy draft. After the fire is burning good, the doors 4—5 may be opened and the door 6 closed, and the heat thrown out into the room, while the draft will be greatly lessened, thus conserving fuel.

I claim:—

A stove comprising a casing adapted to be placed within a fireplace opening upon the hearth, said casing having a grate and a draft opening at its rear and top and having doors closing its front, and means for varying the height of the grate from the hearth, said means comprising plates slidably connected with the ends and the back of the casing and with the lowermost doors, and means in connection with the plates, the casing and the doors for securing the plates in adjusted position.

STUART ALEXANDER JONES.

Witnesses:
G. F. GOODWIN,
MAUDE ESTES.